(12) United States Patent
Hwang

(10) Patent No.: US 7,038,207 B2
(45) Date of Patent: May 2, 2006

(54) CRITICAL DIMENSION MEASUREMENT BY DIFFRATION

(75) Inventor: David H. Hwang, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 10/662,107

(22) Filed: Sep. 12, 2003

(65) Prior Publication Data

US 2005/0057759 A1 Mar. 17, 2005

(51) Int. Cl.
*G01N 21/00* (2006.01)

(52) U.S. Cl. ............................... 250/339.07; 250/252.1

(58) Field of Classification Search .......... 250/339.07, 250/252.1; 356/124, 126, 127, 73, 394
See application file for complete search history.

(56) References Cited

U.S. PATENT DOCUMENTS

| | | | | |
|---|---|---|---|---|
| 4,042,829 A | * | 8/1977 | Atkinson | 250/550 |
| 4,755,052 A | * | 7/1988 | Giglio et al. | 356/336 |
| 4,958,376 A | * | 9/1990 | Leib | 382/210 |
| 5,374,989 A | * | 12/1994 | Takemura et al. | 356/336 |
| 5,530,551 A | * | 6/1996 | Cantrall et al. | 356/394 |
| 5,540,494 A | * | 7/1996 | Purvis et al. | 356/73 |
| 6,429,930 B1 | * | 8/2002 | Littau et al. | 356/124 |
| 6,753,538 B1 | * | 6/2004 | Musil et al. | 250/492.2 |

\* cited by examiner

*Primary Examiner*—Otilia Gabor
(74) *Attorney, Agent, or Firm*—Michael D. Plimier

(57) ABSTRACT

Diffraction which is used to measure features on a substrate layer is disclosed. A substrate, such as a mask structure for microelectronics or a semiconductor substrate with reflective or transmissive features, is irradiated by a source emitting radiation of known wavelength at an angle of incidence relative to the substrate. Given a known pitch, the width of the features themselves is measured by analyzing a diffraction pattern by computer after capturing characteristics of the pattern with a detector.

27 Claims, 5 Drawing Sheets

US 7,038,207 B2

CRITICAL DIMENSION MEASUREMENT BY DIFFRATION

FIELD OF THE INVENTION

This invention relates to measuring a critical dimension in microelectronic devices, and more particularly to use of diffraction patterns to measure the critical dimension in a microelectronic device.

BACKGROUND OF THE INVENTION

Measurement or confirmation of feature size or "critical dimension" ("CD") confirms accuracy and tolerances at many stages of microelectronic device manufacture. For example, CD may be measured upon production of a partially transmissive mask before utilizing said mask to produce layered devices. Subsequent to utilizing a mask to pattern one or more layers of a microelectronic device, CD may again be measured to confirm geometric accuracy and tolerances.

As device sizes continue to shrink, accurately measuring the size of features becomes increasingly difficult. Current methods to provide accurate and precise measurements of CD of small features inexpensively are unsatisfactory. For example, current techniques such as those utilizing scanning electron microscopy or optical metrology may lack the requisite precision due to substrate charging, or may be limited physically by the Raleigh resolution limit associated with light microscopy. In measuring CD of a mask, both current optical and SEM metrology tools lack the ability to measure CD smaller than about 250 nm, due to diffraction and substrate charging. In measuring CD of features on a wafer, current tools lack the ability to measure CD smaller than about 90 nm.

BRIEF DESCRIPTION OF THE DRAWINGS

The present invention is illustrated by way of example and is not limited in the figures of the accompanying drawings, in which like references indicate similar elements. Features shown in the drawings are not intended to be drawn to scale, nor are they intended to be shown in precise positional relationship.

DETAILED DESCRIPTION

In the following detailed description of embodiments of the invention, reference is made to the accompanying drawings in which like references indicate similar elements. The illustrative embodiments described herein are disclosed in sufficient detail to enable those skilled in the art to practice the invention. The following detailed description is therefore not to be taken in a limiting sense, and the scope of the invention is defined only by the appended claims.

Figure 1:
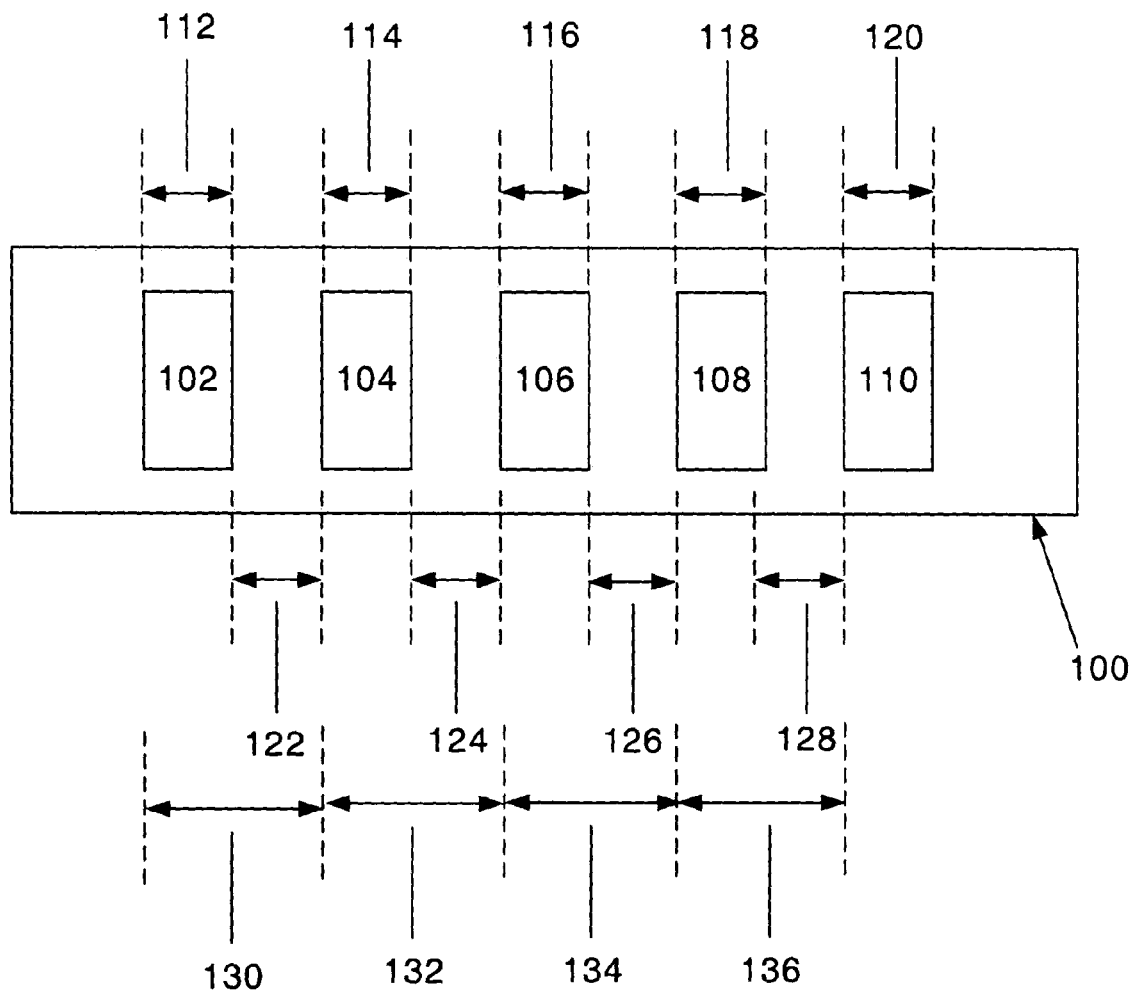
FIG. 1 depicts a top view of various aspects of a substrate with reflective or transmissive features, the geometry of which may be measured in accordance with one embodiment of the present invention.

Referring to FIG. 1, an example substrate (100) is depicted with a series of example features (102, 104, 106, 108, 110). In the case of a mask structure such as those utilized for semiconductor patterning, the features (102, 104, 106, 108, 110) may be translucent to various types of radiation, while the surrounding substrate (100) material is configured to be substantially opaque to various types of radiation. In the case of a semiconductor structure, the features (102, 104, 106, 108, 110) may be layers formed, for example, to define gates, while the substrate (100) may comprise a semiconducting material such as silicon. In such semiconductor structures, the features (102, 104, 106, 108, 110) may be reflective of various types of radiation. The CDs of various other arrangements of features on substrates may also be measured.

In the illustrated embodiment, the feature size to be measured is be the widths "w" (112, 114, 116, 118, 120) of the features (102, 104, 106, 108, 110), although other dimensions may be measured as the CD in other embodiments. The features (102, 104, 106, 108, 110) may be spaced apart, with spacings "d" (122, 124, 126, 128) between the features (102, 104, 106, 108, 110). There is a spacing "d" (122) between features (102) and (104), for example. Further, there may be pitches "p" (130, 132, 134, 136), which are the sum of a spacing "d" (122, 124, 126, or 128) and a width "w" (102, 104, 106, or 108). For example, the pitch "p" (130) may be equal to the sum of width "w" (112) of feature (102) plus the spacing "d" (122) between feature (102) and feature (104). In an embodiment, the pitches "p" (130, 132, 134, 136) may be known.

Figure 2:
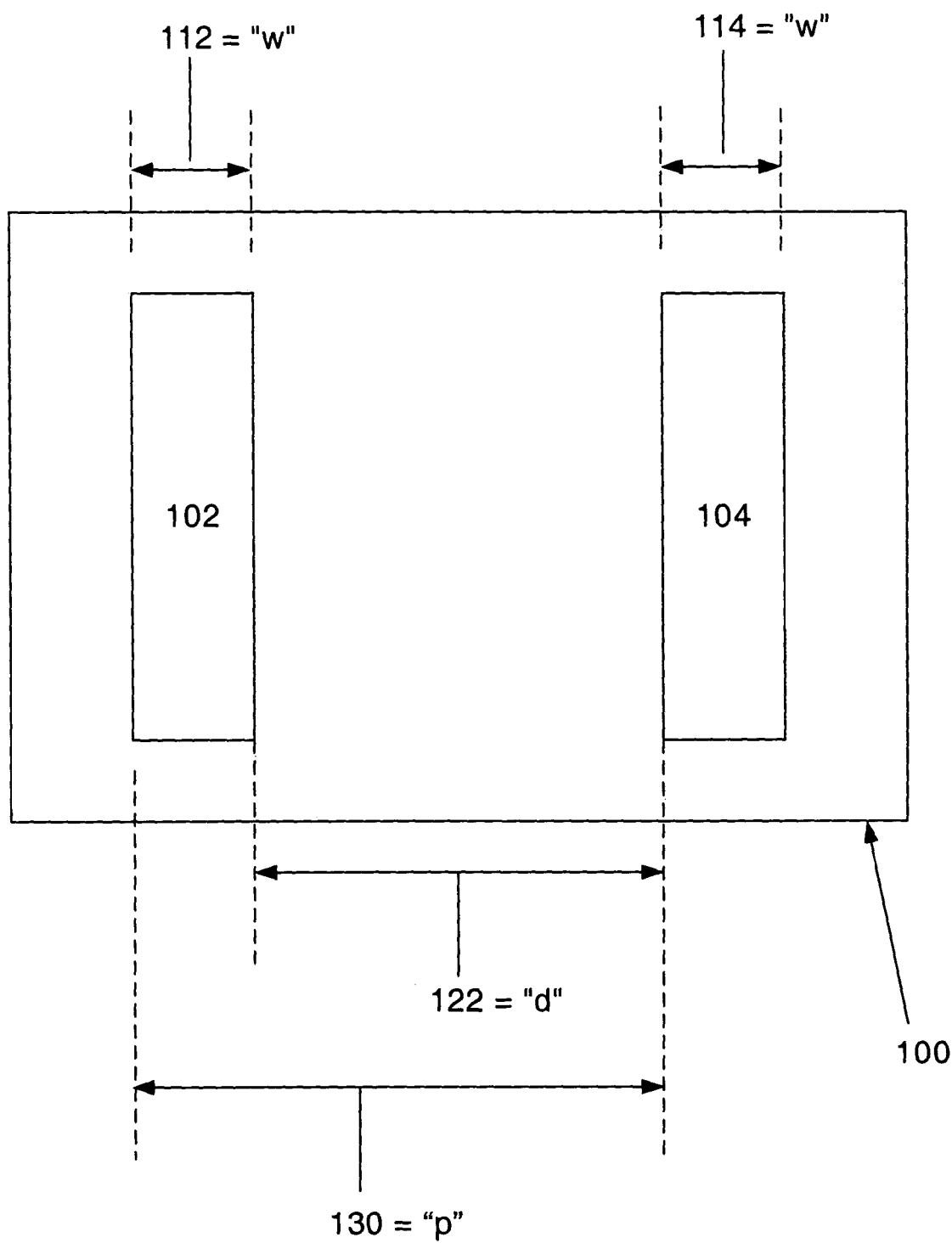
FIG. 2 depicts a close-up top view of various aspects of a substrate with reflective or transmissive features, the geometry of which may be measured in accordance with one embodiment of the present invention.

Referring to FIG. 2, this measurement task is illustrated with a closer view of the substrate (100) and two adjacent features (102, 104). The pitch "p" (130) (the sum of the distance "d" (122) between the two features (102, 104) and the width "w" (112) of feature (102)) is known in this embodiment. The feature size to be measured in this embodiment is the width "w" (112) of the feature (102).

Figure 3A:
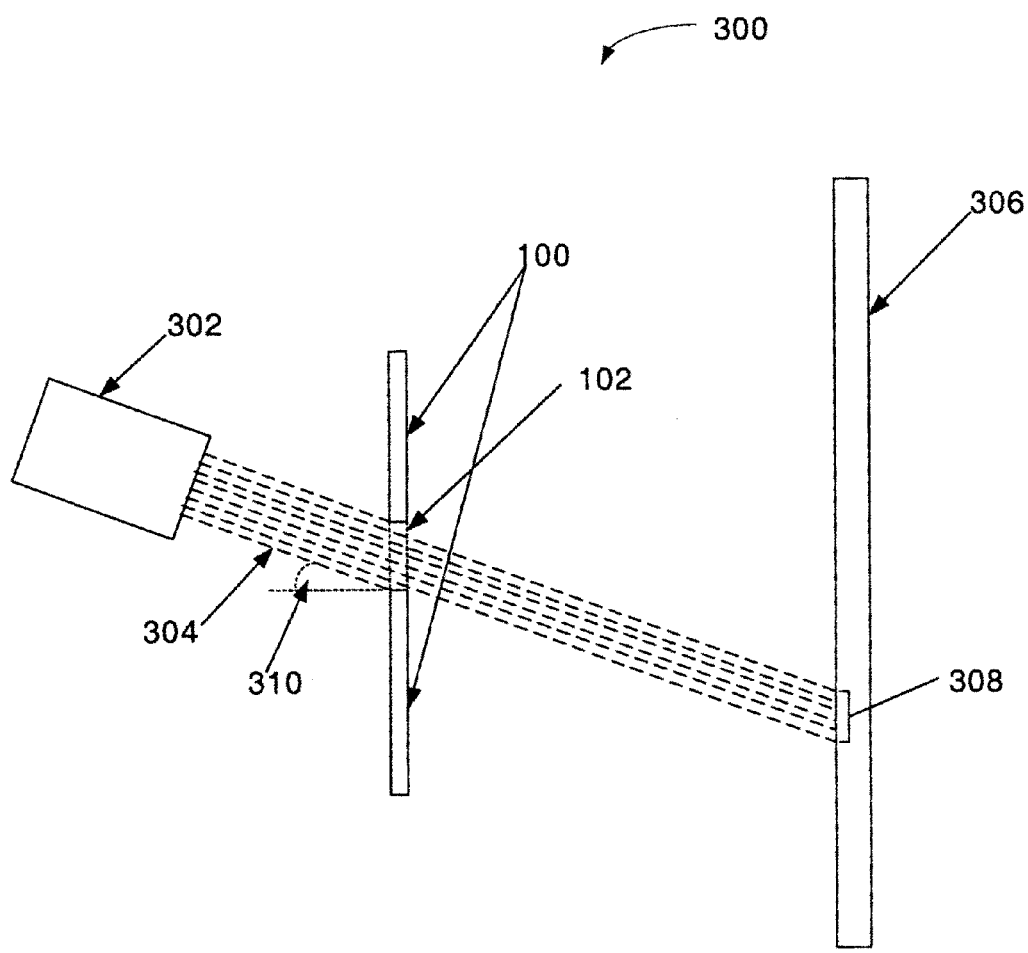
FIG. 3A depicts a cross-sectional side view of various aspects of one embodiment of the present invention wherein radiation passed through a transmissive feature is detected on the opposite side of the feature from the radiation source.

Referring to FIG. 3A, an embodiment of a system (300) to measure CD or feature size is illustrated. This embodiment of the system (300) utilizes diffraction pattern matching to measure the CD. FIG. 3A is a side view showing a substrate (100) and feature (102), such as those depicted in FIGS. 1 and 2, in cross section. A radiation source (302), such as a laser, x-ray source, or high-energy electron source, may be utilized to irradiate the substrate (100) and feature (102), with the radiation (304) striking the substrate at an angle of incidence (310). In the embodiment of the system (300) illustrated in FIG. 3A, the substrate (100) is substantially opaque to the incoming radiation (304) at the angle of incidence (310) while the feature (102) allows passthrough of such radiation (304) to produce a diffraction pattern (308). This diffraction pattern (308) strikes a detector (306), which detects the diffraction pattern (308).

In an embodiment, the substrate (100) may be held in place by a stage (not shown) which is capable of highly-accurate positioning of the substrate (100) relative to the source (302) and detector (306). Precision stages for focusing in on features are known, and are available, for example, for SEM, e-beam exposure tools, wafer stepper/scanner stages, and interferometer applications by suppliers such as Hewlett Packard Company. Detectors (306) for detecting diffraction patterns (308), including the positions of diffraction pattern maxima and minima, are well known in the art. For example, with x-ray radiation, diffraction tools such as the XDS2000 X-ray Diffractometer from Scintag Corporation comprise high-resolution maxima and minima detectors. Should x-ray or high-energy electron be utilized as the irradiation modality, a vacuum enclosure (not shown) around the radiation source, stage, and detector may be used in some embodiments. In other embodiments, laser light may be used as the radiation (304), and no vacuum enclosure may be used. In one embodiment, a laser source with a wavelength "λ" longer or larger than "w," for example, a helium-neon laser having radiation (304) wavelength of about 633 nanometers, may be utilized as a source (302), and a charge-coupled device ("CCD chip") may be utilized as a detector (306) of the diffraction pattern (308).

In an embodiment, the detector (306) may be connected to a computer system (not shown) to capture and store the diffraction pattern (308), including the diffraction pattern maxima and minima, for later use.

Figure 3B:
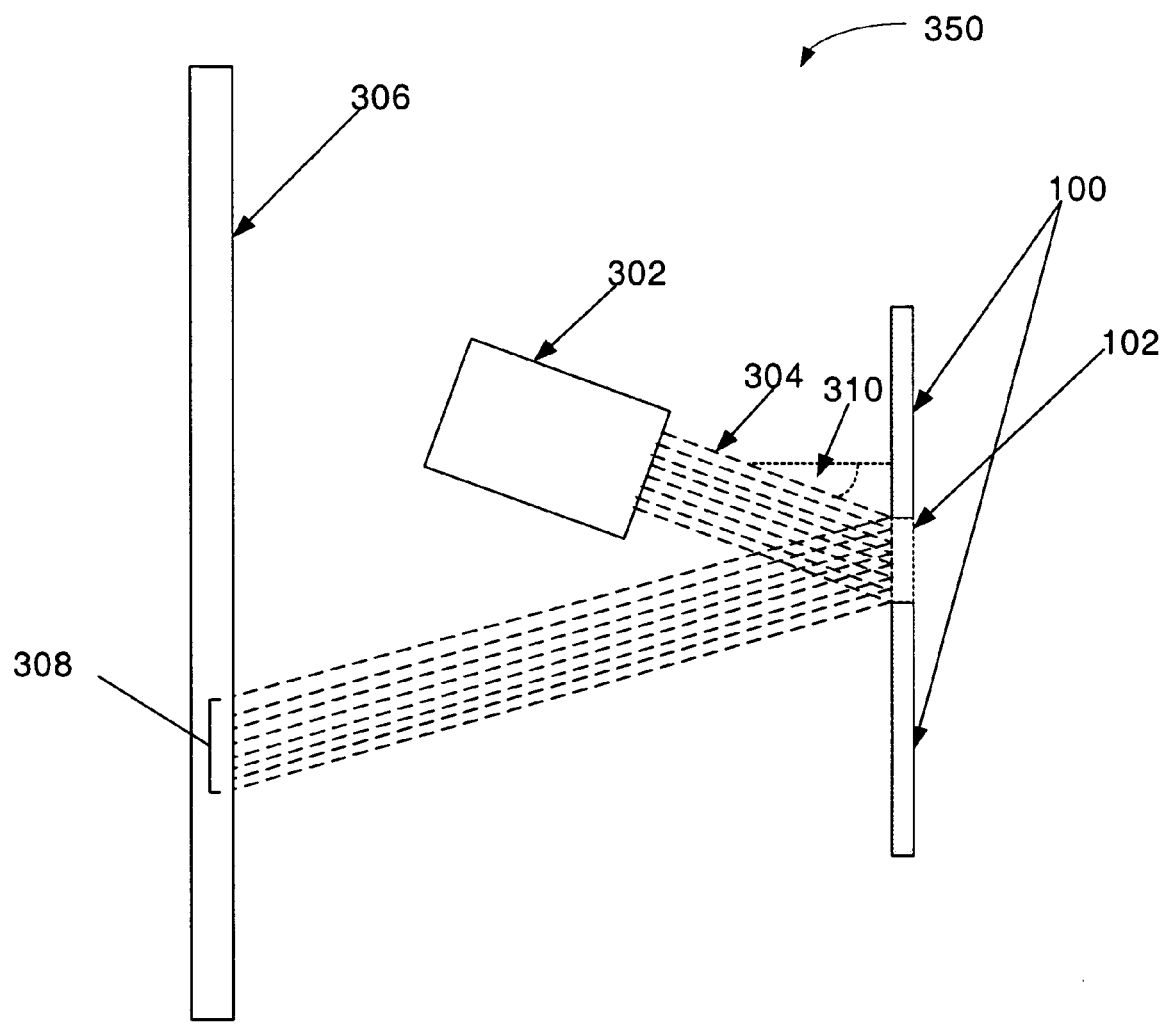
FIG. 3B depicts a cross-sectional side view of various aspects of one embodiment of the present invention wherein radiation reflected off of a reflective feature is detected on the same side of the feature as the radiation source.

Referring to FIG. 3B, an embodiment of an alternate system (350) to measure CD is depicted. The alternate system (350) illustrated in FIG. 3B is similar to the system (300) illustrate in FIG. 3A. However, in FIG. 3B the feature (102) reflects the radiation (304) back toward the source (302). Thus, a diffraction pattern (308) is created on the same side of the substrate (100) as the source (302). The detector (306) is on the same side of the substrate (100) as the source (302) to detect the diffraction pattern (308) that is formed by reflection of the radiation (304) by the feature (102). The detector (306) may be connected to a computer system (not shown) to capture and store the diffraction pattern (308), including the diffraction pattern maxima and minima, for later use.

Figure 4:
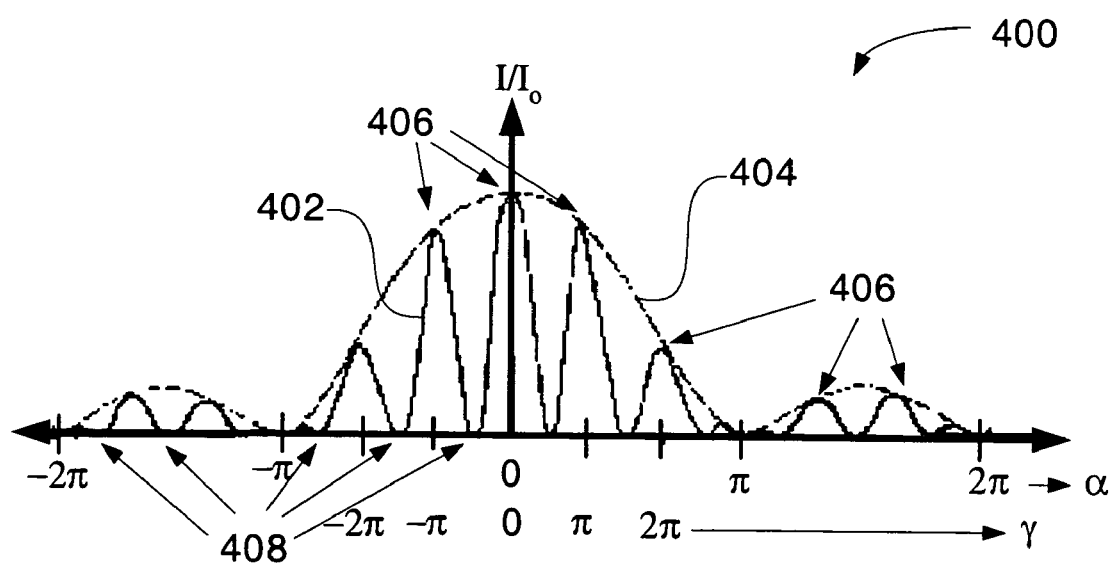
FIG. 4 depicts a representation of a diffraction pattern and associated relationships conventional to diffraction analysis.

Referring to FIG. 4, one embodiment of a graphical depiction (400), or "graph," of the diffraction pattern (308) detected by the detector (306) is illustrated. Such a graph (400) may be generated, for example, by a computer system to which the detector (306) is connected. The graph (400) of FIG. 4 shows a diffraction pattern intensity plot (402) as well as an envelope plot (404) that follows along the maximas (406) of the diffraction pattern intensity plot (402).

The graph (400) of the diffraction pattern is related to the size (112) of the feature (102) to be measured. In an example based on FIG. 2, the maximas (406) and minimas (408) of the graph (400) are dependent upon the spacing between features (122) and the feature size (112) of the feature (102). As illustrated in FIG. 3, the diffraction pattern intensity plot (402), "I/I$_o$," is given by Equations 1 through 3:

$$I/I_o = ((\text{Sin}(\alpha))/\alpha)^2 * \text{Cos}^2(\gamma) \qquad \text{(Eqn. 1)}:$$

where:

$$\alpha = 0.5 * k * w * \text{Sin}(\theta) \qquad \text{(Eqn. 2)}:$$

$$\gamma = 0.5 * k * d * \text{Sin}(\theta) \qquad \text{(Eqn. 3)}:$$

w=the feature size (112)
d=the spacing between features (122)
θ=the angle of incidence (310)
k=the number of waves per unit length, equal to 2π/λ, and
λ=the wavelength of incident light from the source (302)

The angle of incidence (310) may be a selected, known value. As described above, pitch may be a known value equal to the sum of "d" and "w." Thus, the spacing "d" (122) may be given in Equation 4 as:

$$d = p - w \qquad \text{(Eqn. 4)}:$$

Given this information, Equation 1 therefore sets out the relationship of the diffraction pattern intensity "I/I$_o$" (402) to the feature size "w" (112).

The envelope plot (404) is also related to feature size and may also be used to aid in determining the feature size "w" (112). The envelope plot (404), is related to the feature size because the envelope plot is defined by (Sin (α))/α)$^2$, where Equation 2 above defines α.

Thus, for a given pitch "p" (130), different feature (102) widths (112) will result in different diffraction patterns (308), and different plots (402, 404) of the diffraction patterns (308), as shown by Equations 1–4.

In one embodiment, one or more of these relationships between the diffraction pattern (308) and feature size (112) may be used to quickly determine the feature size (112) of the feature (102) through a comparison process. In an embodiment, aspects of the diffraction pattern (308) may be used as a feature size identifier, or "fingerprint," of the CD being measured. In various embodiments, the feature size identifier, or "fingerprint," may be the diffraction pattern intensity plot (402), the envelope plot (404), both plots (402, 404), locations of the maximas (406) of the diffraction pattern intensity plot (402), locations of the minimas (408) of the diffraction pattern intensity plot (402), or other aspects of the diffraction pattern (308) or combinations of aspects of the diffraction pattern (308).

In an embodiment, a computer system has a stored library of such "fingerprints," each of which is associated with a particular known pitch "p." The computer may receive the detected diffraction pattern (308) from the detector (306). The "fingerprint" of the feature (102) being measured may then be compared with the stored library of "fingerprints" to find a match and thereby determine the feature size (112) of the feature (102) being measured. Since the pitch "p" (130) of the feature (102) being measured is known, the detected feature size identifier may be compared with stored feature size identifiers with the same pitch "p" to determine the feature size in an embodiment. Pattern matching algorithms and software applicable to such a task are well known.

In summary, a detected diffraction pattern (308) for a feature (102) with a known pitch (130) may include a feature size identifier related to the size of the feature (102). This feature size identifier may be compared to a library of feature size identifiers that correspond to known feature sizes. Matching the feature size identifier to an identifier in the library may then identify the size of the feature (102) being measured.

In another embodiment, the feature size (112) may be calculated using the detected diffraction pattern intensity and the equations above. For example, "w" and "d" may be solved for by solving Equations 2 and 3 simultaneously (two variables defined by two equations), given a known value of θ and selected values of α and γ. Other ways to calculate "w" and "d" from the detected diffraction pattern intensity and the equations above may also be used. For example, the magnitude of a detected feature size identifier, such as the intensity of a particular maxima (406) or minima (408) at a specific selected value of α and γ may be quantified by a computer or other device connected to the detector (306). This quantified intensity and the values for α and γ may be used in conjunction with the Equations above to calculate the feature size.

Thus, a novel CD measurement solution is disclosed. Although the invention is described herein with reference to specific embodiments, many modifications therein will readily occur to those of ordinary skill in the art. Accordingly, all such variations and modifications are included within the intended scope of the invention as defined by the following claims.

I claim:

1. A method comprising:
   irradiating a feature having a size with radiation from a radiation source to form a diffraction pattern, wherein the feature is substantially static in relatiousbip to the radiation source;
   detecting the diffraction pattern with a detector; and
   comparing a feature size identifier from the diffraction pattern with a library of feature size identifiers, each feature size identifier in the library being associated with a known feature size.

2. The method of claim 1 wherein the radiation from the radiation source comprises radiation with a wavelength longer than the feature size.

3. The method of claim 1 wherein the radiation source comprises a helium-neon laser.

4. The method of claim 1 wherein the radiation from the radiation source comprises radiation with a wavelength of about 633 nanometers.

5. The method of claim 1 wherein the feature is transmissive to the radiation, and detecting is accomplished opposite the feature from the radiation source.

6. The method of claim 5 wherein the feature comprises a transmissive window defined by a substantially radiation-opaque microelectronic structure mask substrate.

7. The method of claim 1 wherein the feature is substantially reflective to the radiation, and detecting is accomplished on the same side of the feature as the radiation source.

8. The method of claim 7 wherein the feature is defined into a substantially radiation-opaque microelectronic structure substrate.

9. The method of claim 1 wherein the feature size identifier comprises the positions of maxima within the diffraction pattern.

10. The method of claim 1 wherein the detector comprises a charge-coupled device.

11. The method of claim 1 wherein irradiating a feature comprises irradiating with x-ray radiation or high-energy electrons.

12. A system comprising:
    a radiation source to emit radiation directed at a subject structure that includes a feature with a size to be measured;
    a stage adapted to hold the feature substantially static in relationship to the radiation source;
    a detector to detect a diffraction pattern caused by the radiation interacting with the feature and to generate a signal representative of at least part of the diffraction pattern; and
    a computer coupled to the detector to receive the signal representative of at least part of the diffraction pattern and to compare a feature size identifier of the diffraction pattern with a library of feature size identifiers, each feature size identifier in the library being associated with a known feature size.

13. The system of claim 12 wherein the radiation source is a laser.

14. The system of claim 13 wherein the laser is a helium-neon laser.

15. The system of claim 14 wherein the helium-neon laser emits radiation having a wavelength of about 633 nanometers.

16. The system of claim 12 wherein the detector comprises a charge-coupled device to detect the positions of diffraction intensity maxima.

17. The system of claim 12 wherein the radiation source is an x-ray source.

18. The system of claim 17 further comprising a vacuum enclosure surrounding the radiation source, stage, and detector.

19. The system of claim 12 wherein the radiation source is a high-energy electron source.

20. The system of claim 19 further comprising a vacuum enclosure surrounding the radiation source, stage, and detector.

21. A method comprising:
    directing radiation from a radiation source to a structure that includes a feature with a size to be measured, the feature being substantially static relative to the radiation source;
    detecting a diffraction pattern formed by an interaction of the radiation with the feature;
    determining a feature size identifier from the detected diffraction pattern; and
    determining the size of the feature based on the feature size identifier.

22. The method of claim 21 wherein determining the size of the feature based on the feature size identifier comprises comparing the feature size identifier with a library of feature size identifiers, each feature size identifier in the library being associated with a known feature size.

23. The method of claim 22 wherein the feature size identifier comprises a set of maxima locations within the diffraction pattern.

24. The method of claim 22 wherein the feature size identifier comprises a set of minima locations within the diffraction pattern.

25. The method of claim 22 wherein the feature size identifier comprises an envelope plot.

26. The method of claim 21 wherein the feature has a known pitch.

27. The method of claim 21, wherein determining the size of the feature based on the feature size identifier comprises calculating the feature size.

* * * * *